July 5, 1949. C. A. NICHOLSON 2,474,858
AIRCRAFT ARRESTING OR RETARDING GEAR
Filed Jan. 22, 1940 16 Sheets-Sheet 1

INVENTOR
CHARLES A. NICHOLSON
BY
W Glenn Jones
ATTORNEY

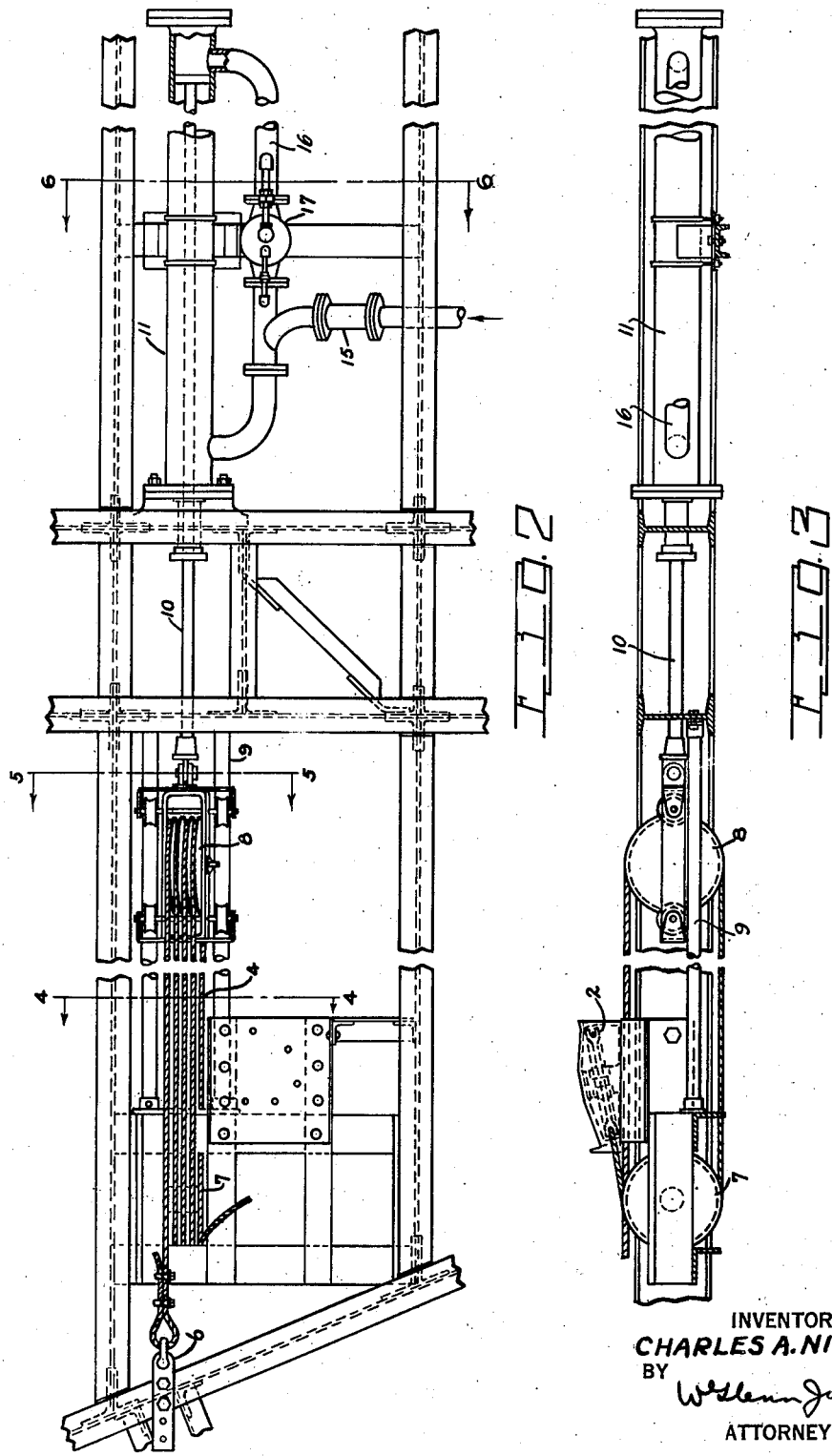

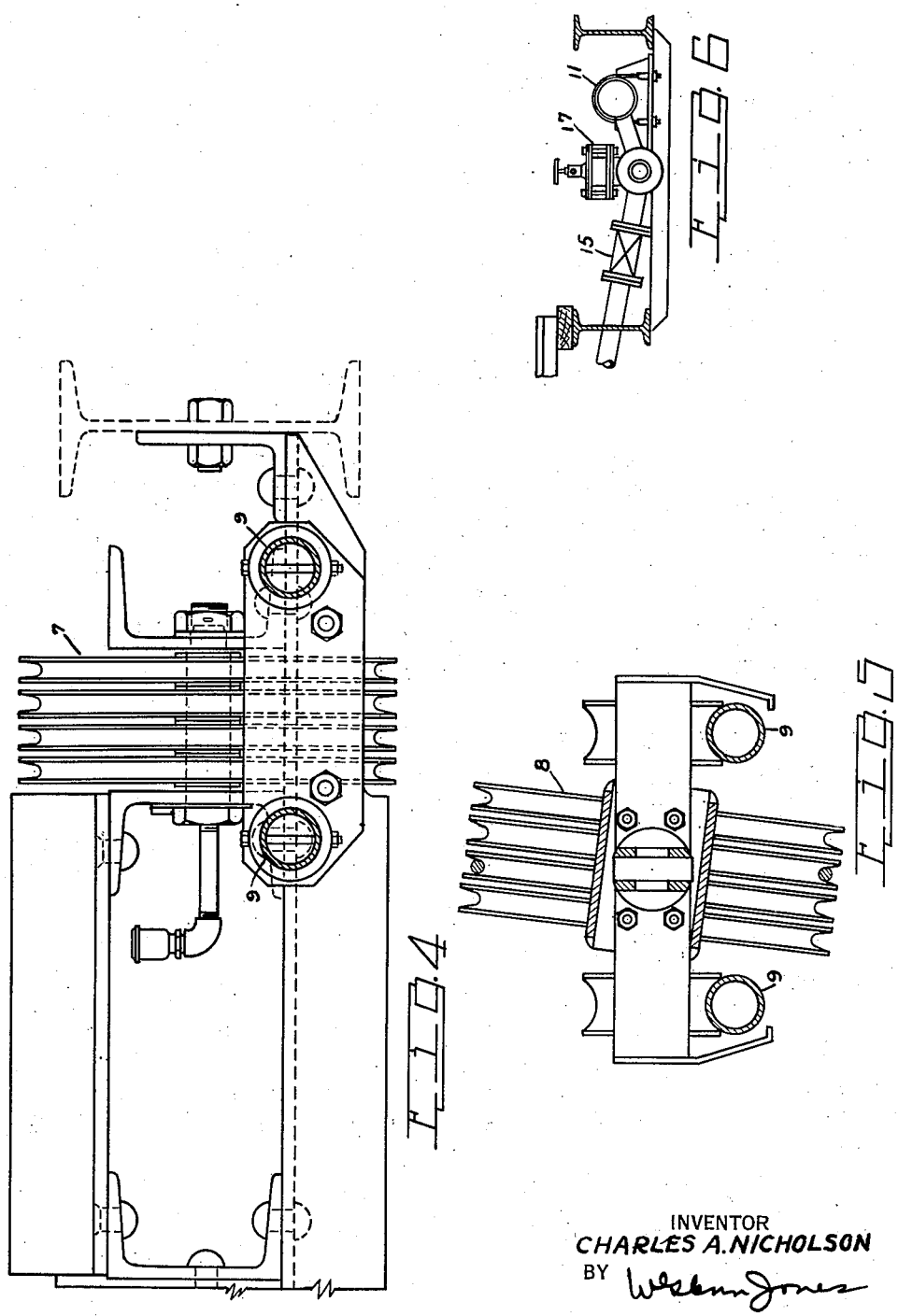

July 5, 1949. C. A. NICHOLSON 2,474,858
AIRCRAFT ARRESTING OR RETARDING GEAR
Filed Jan. 22, 1940 16 Sheets-Sheet 4
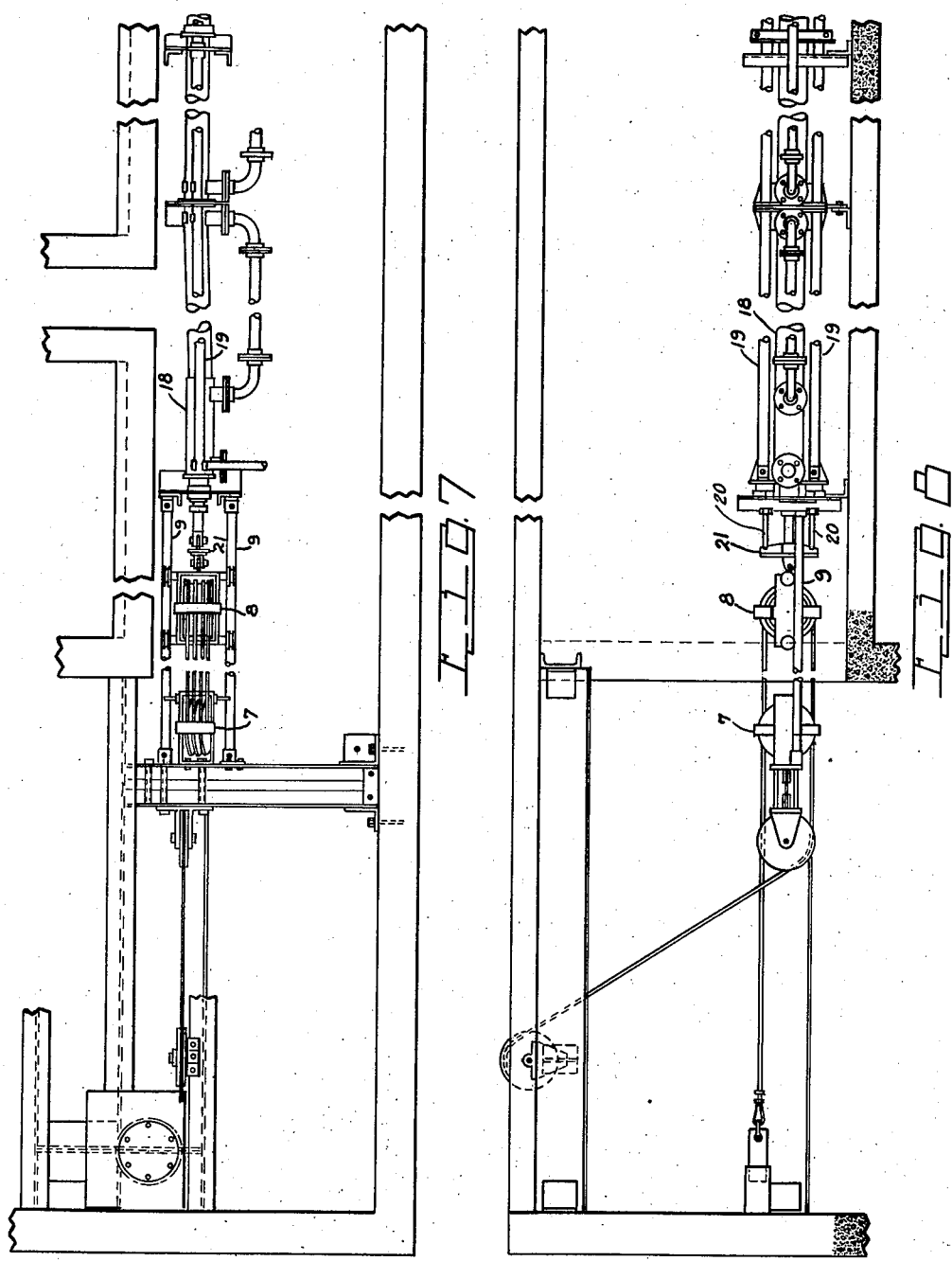
INVENTOR
CHARLES A. NICHOLSON
BY
ATTORNEY

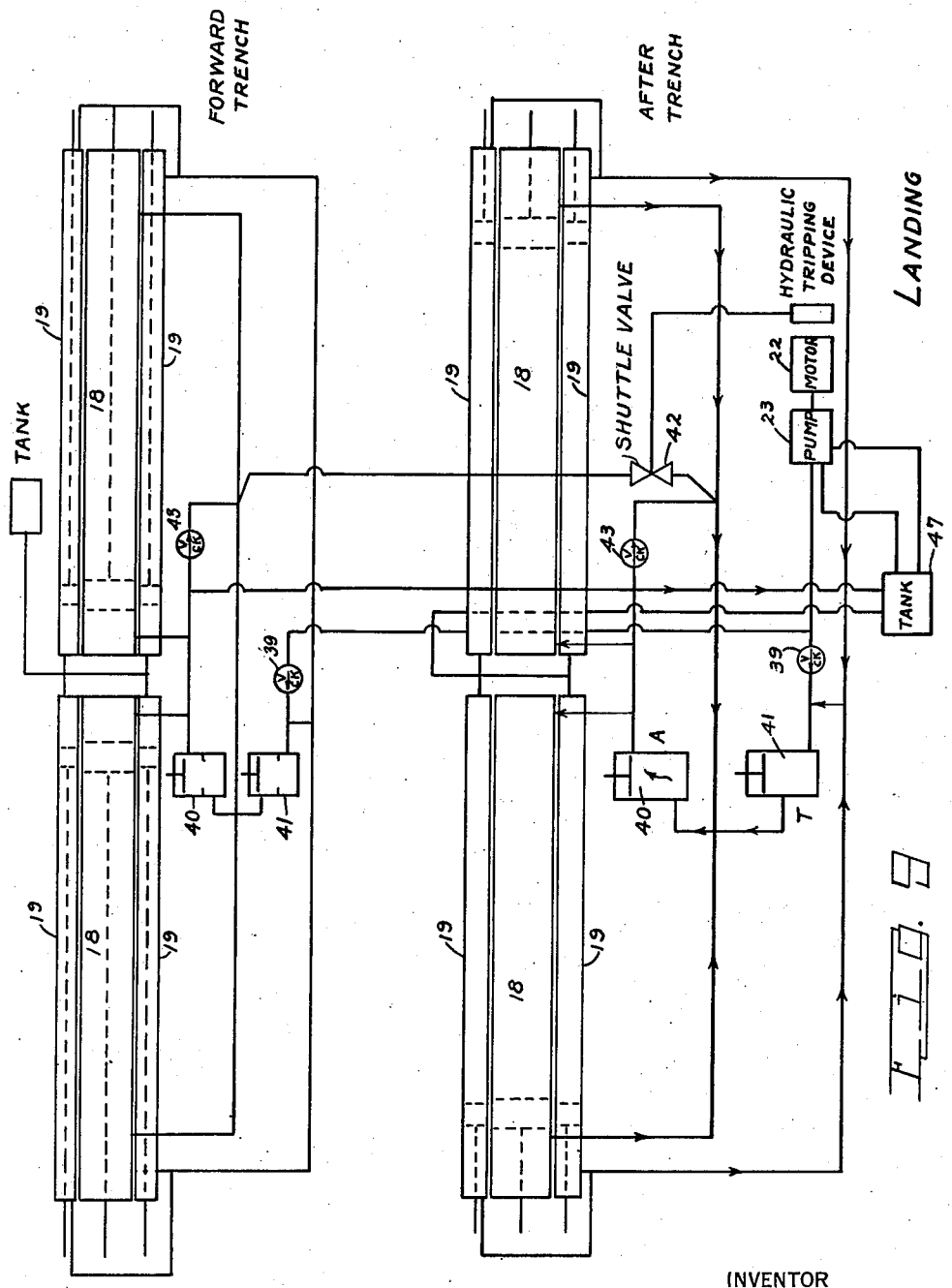

July 5, 1949.  C. A. NICHOLSON  2,474,858
AIRCRAFT ARRESTING OR RETARDING GEAR
Filed Jan. 22, 1940  16 Sheets-Sheet 6
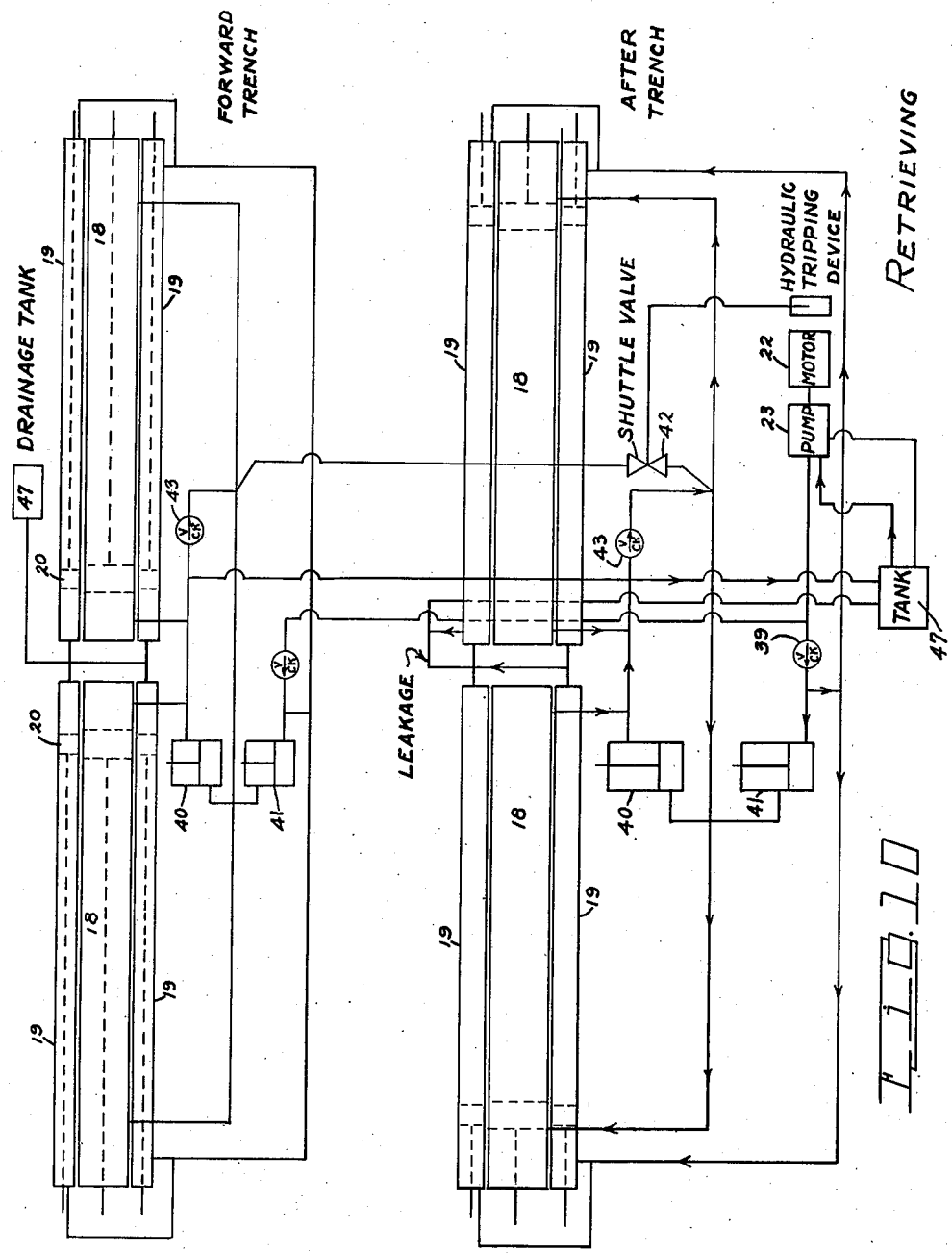
INVENTOR
CHARLES A. NICHOLSON
BY
ATTORNEY July 5, 1949.  C. A. NICHOLSON  2,474,858
AIRCRAFT ARRESTING OR RETARDING GEAR
Filed Jan. 22, 1940  16 Sheets-Sheet 7
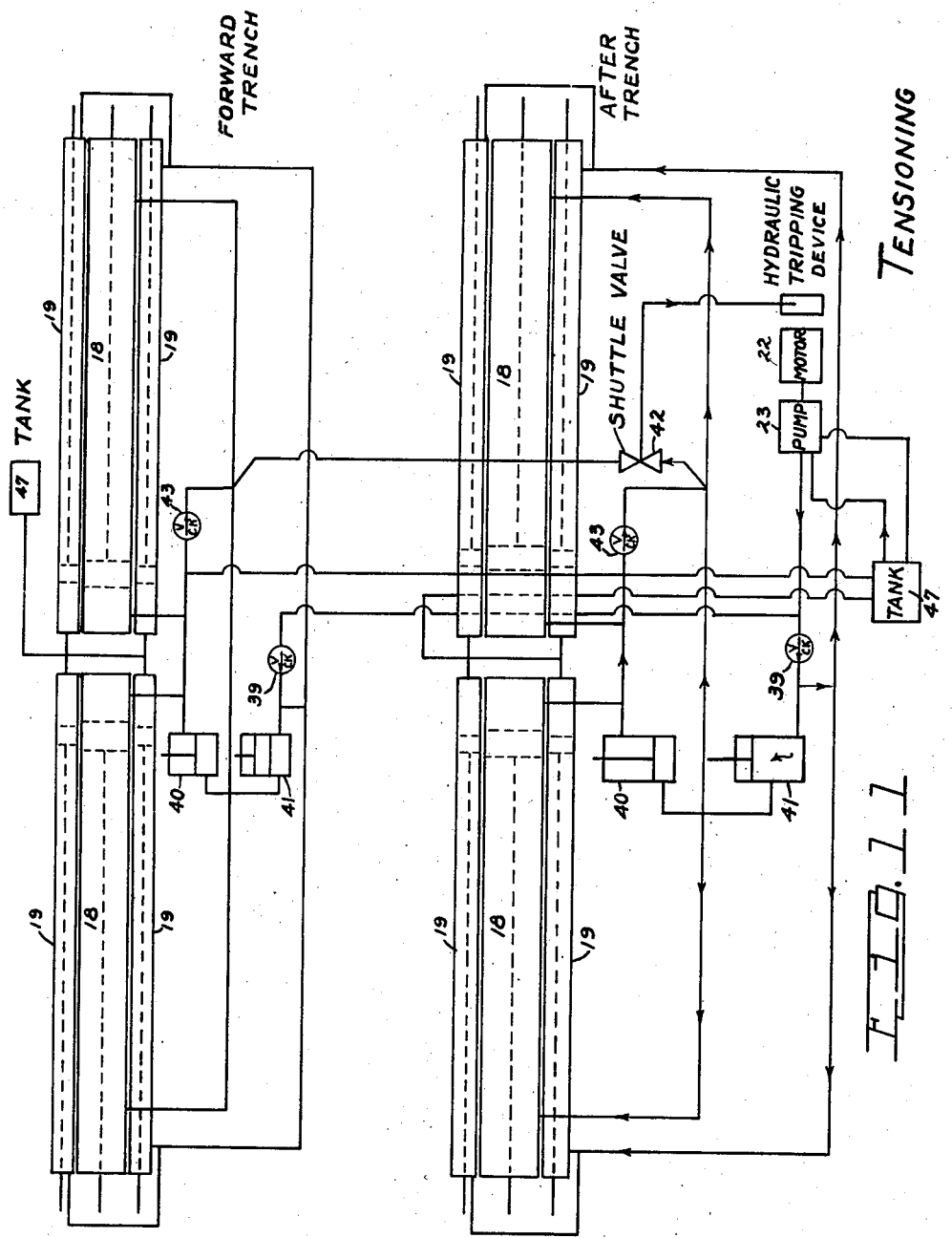
INVENTOR
CHARLES A. NICHOLSON
BY
ATTORNEY July 5, 1949.　　　　C. A. NICHOLSON　　　　2,474,858
AIRCRAFT ARRESTING OR RETARDING GEAR
Filed Jan. 22, 1940　　　　　　　　　　　　16 Sheets-Sheet 8

INVENTOR
CHARLES A. NICHOLSON
BY
W. Glenn Jones
ATTORNEY

July 5, 1949.  C. A. NICHOLSON  2,474,858
AIRCRAFT ARRESTING OR RETARDING GEAR
Filed Jan. 22, 1940  16 Sheets-Sheet 9
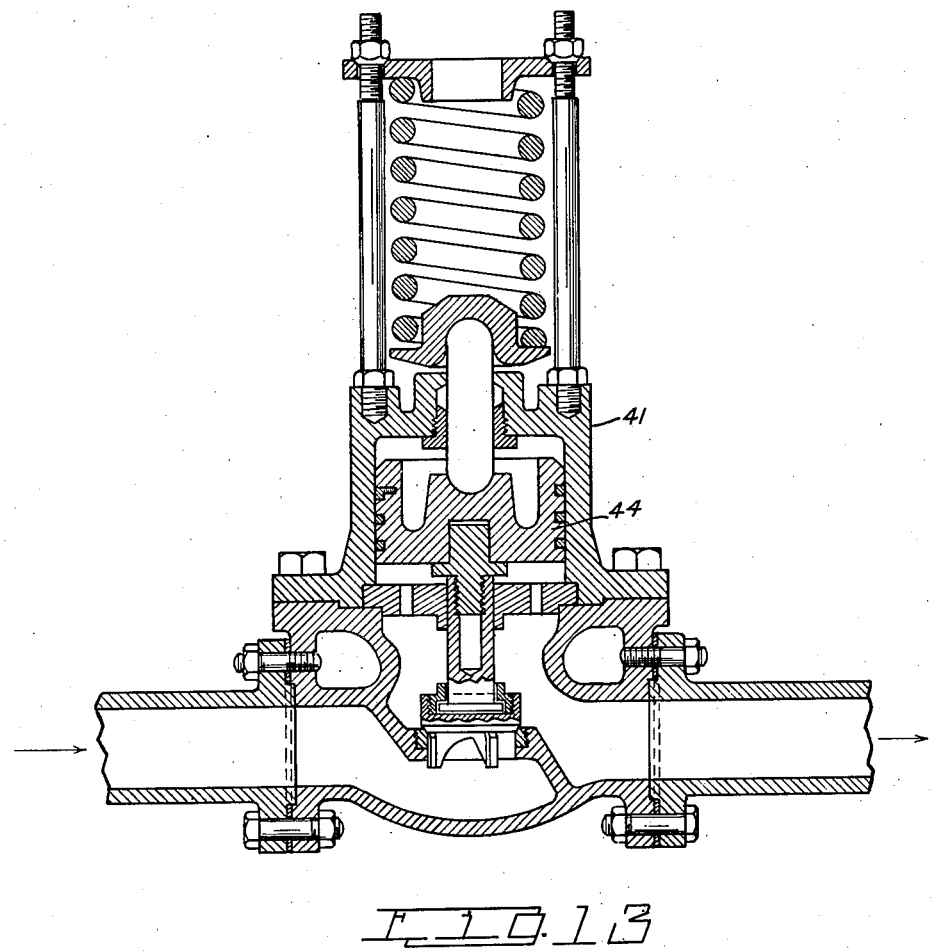
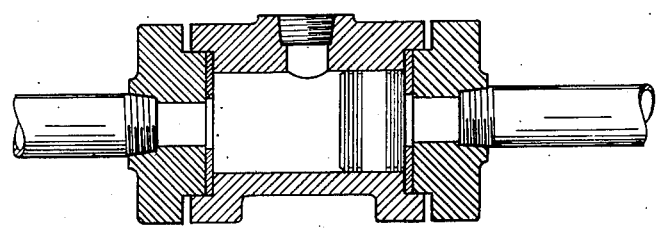
INVENTOR
CHARLES A. NICHOLSON
BY
ATTORNEY

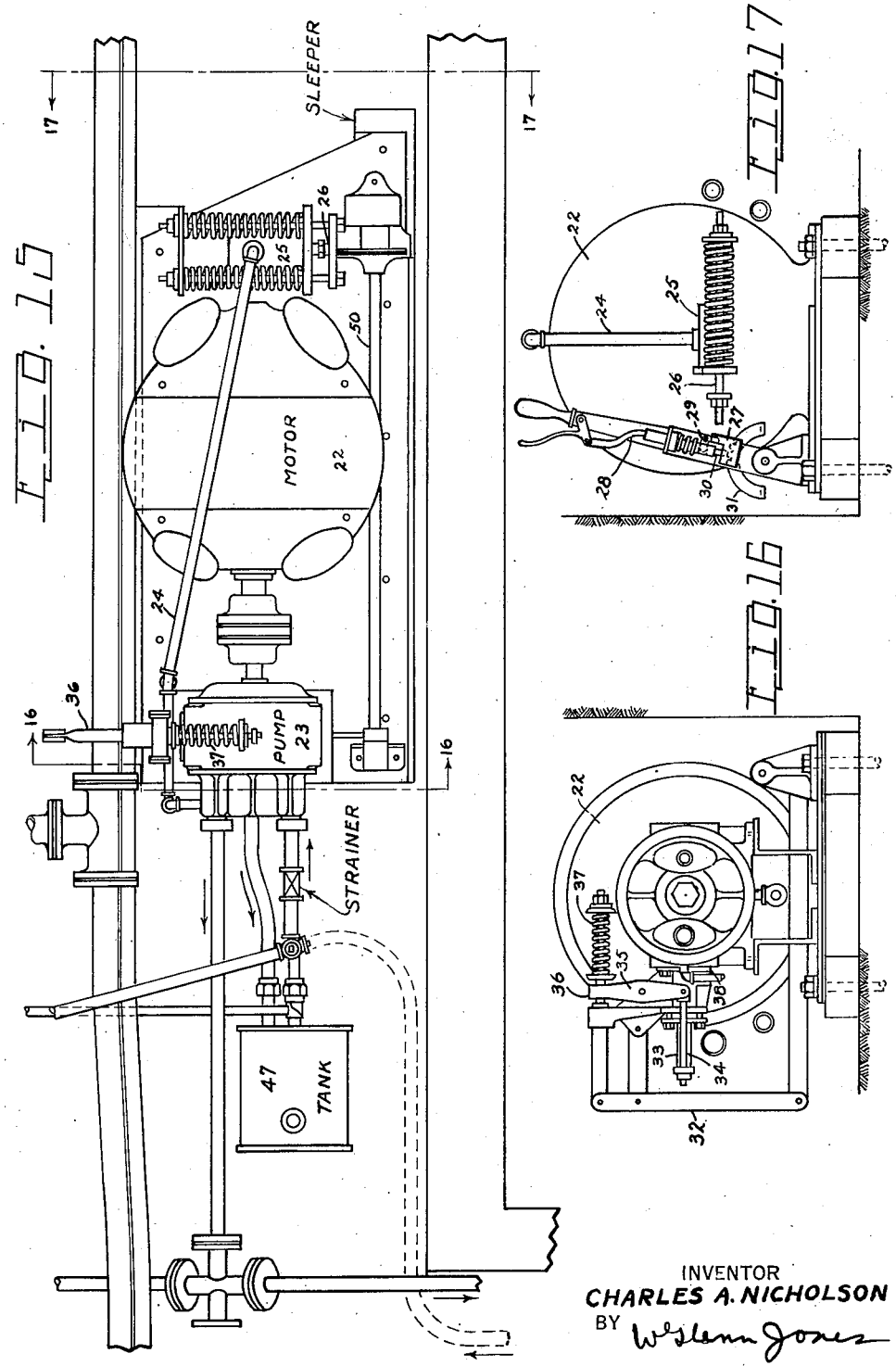

July 5, 1949. C. A. NICHOLSON 2,474,858
AIRCRAFT ARRESTING OR RETARDING GEAR
Filed Jan. 22, 1940 16 Sheets-Sheet 11
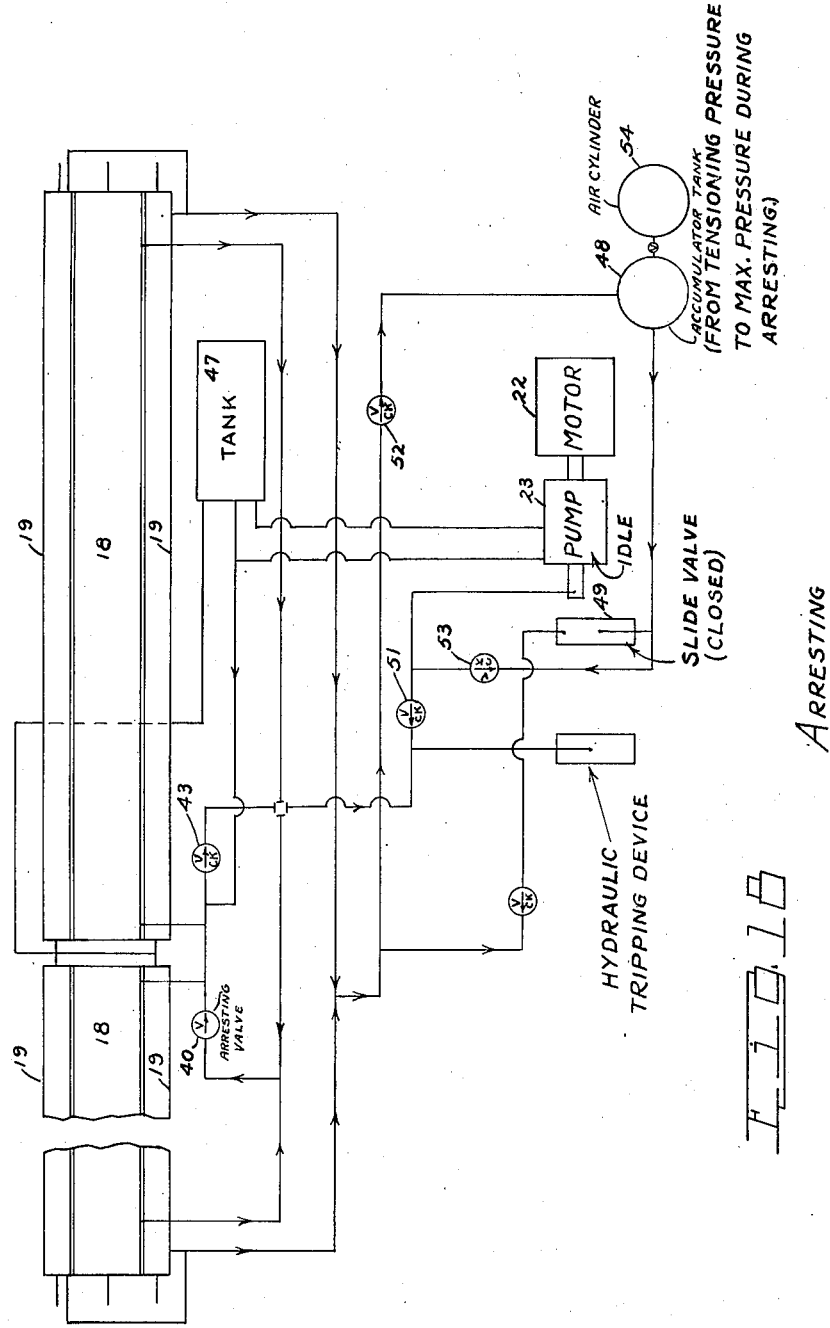
INVENTOR
CHARLES A. NICHOLSON
BY
ATTORNEY

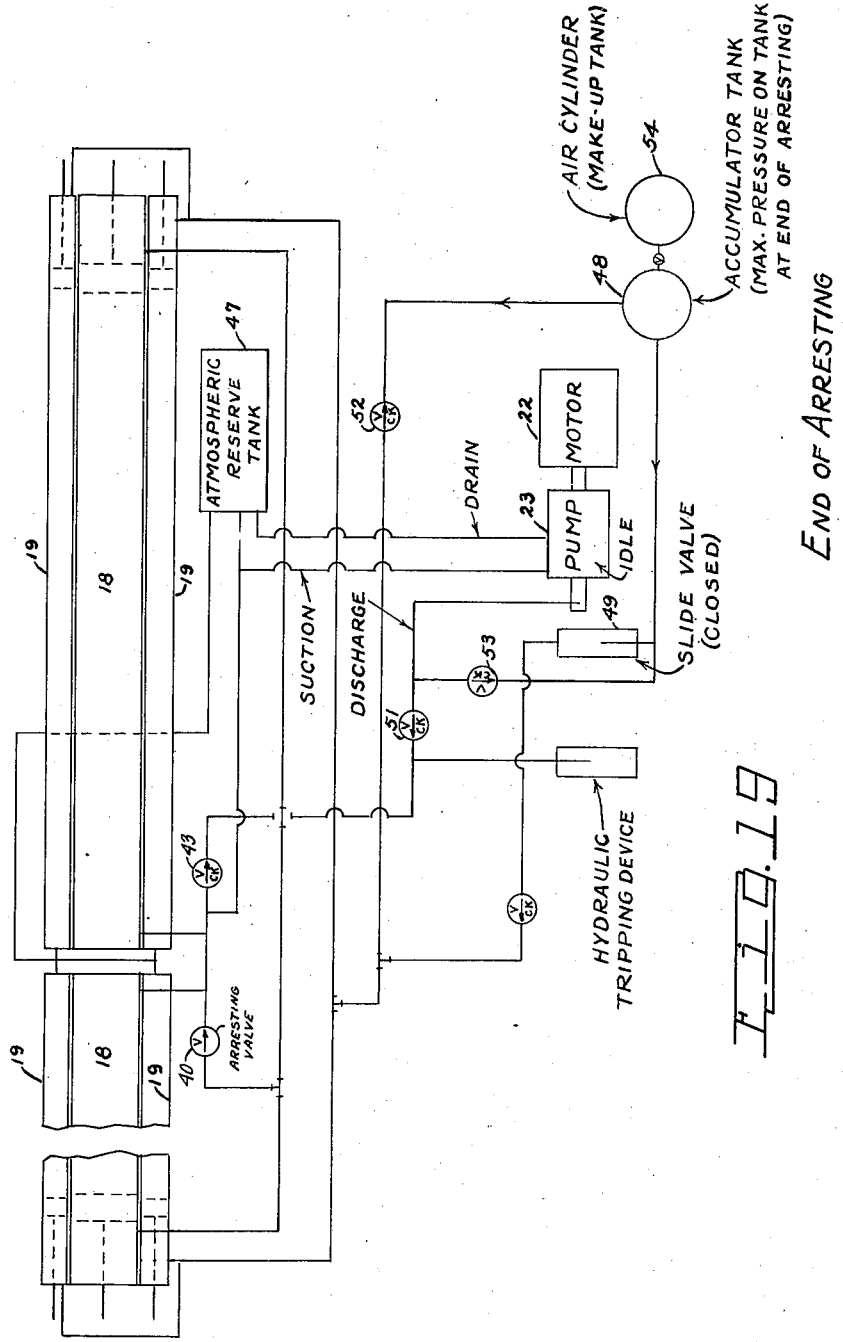

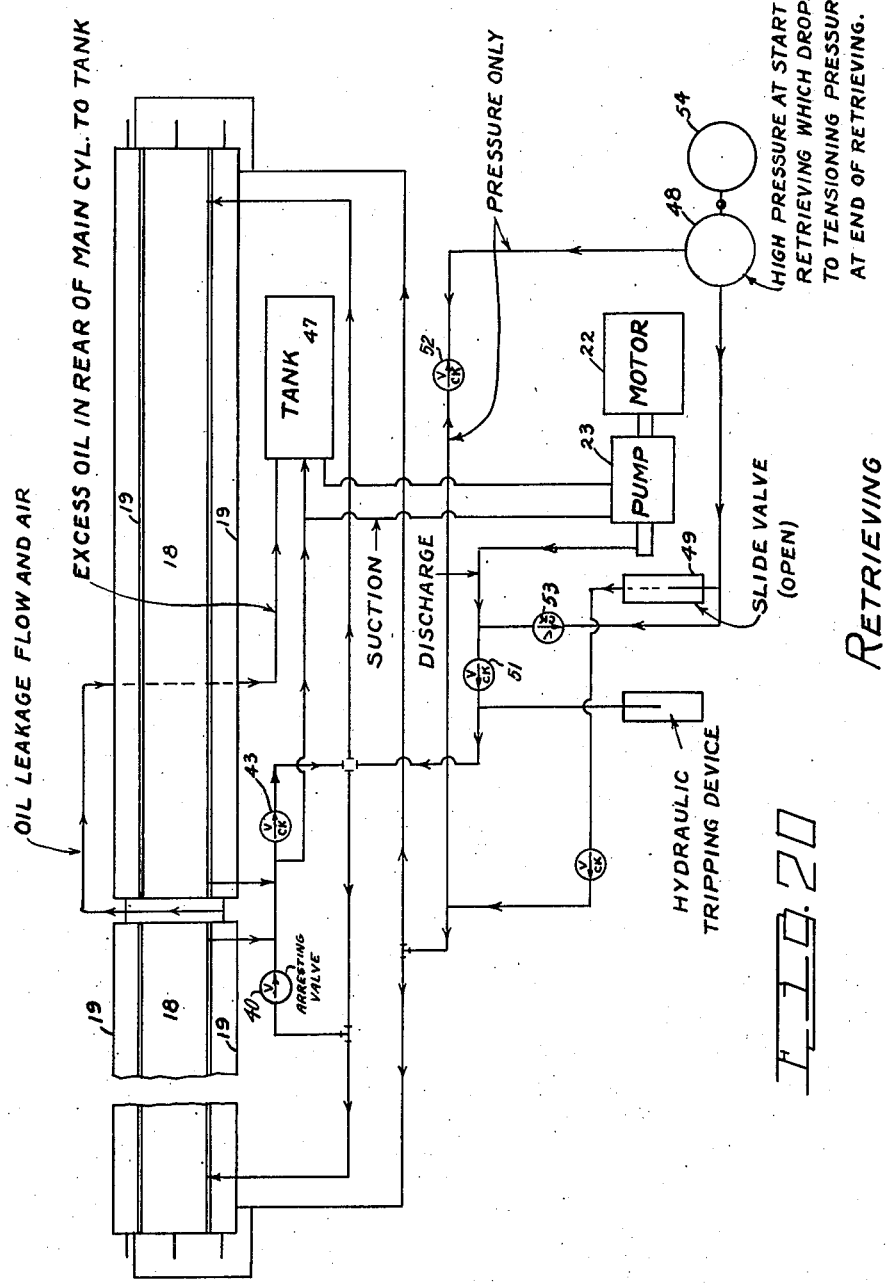

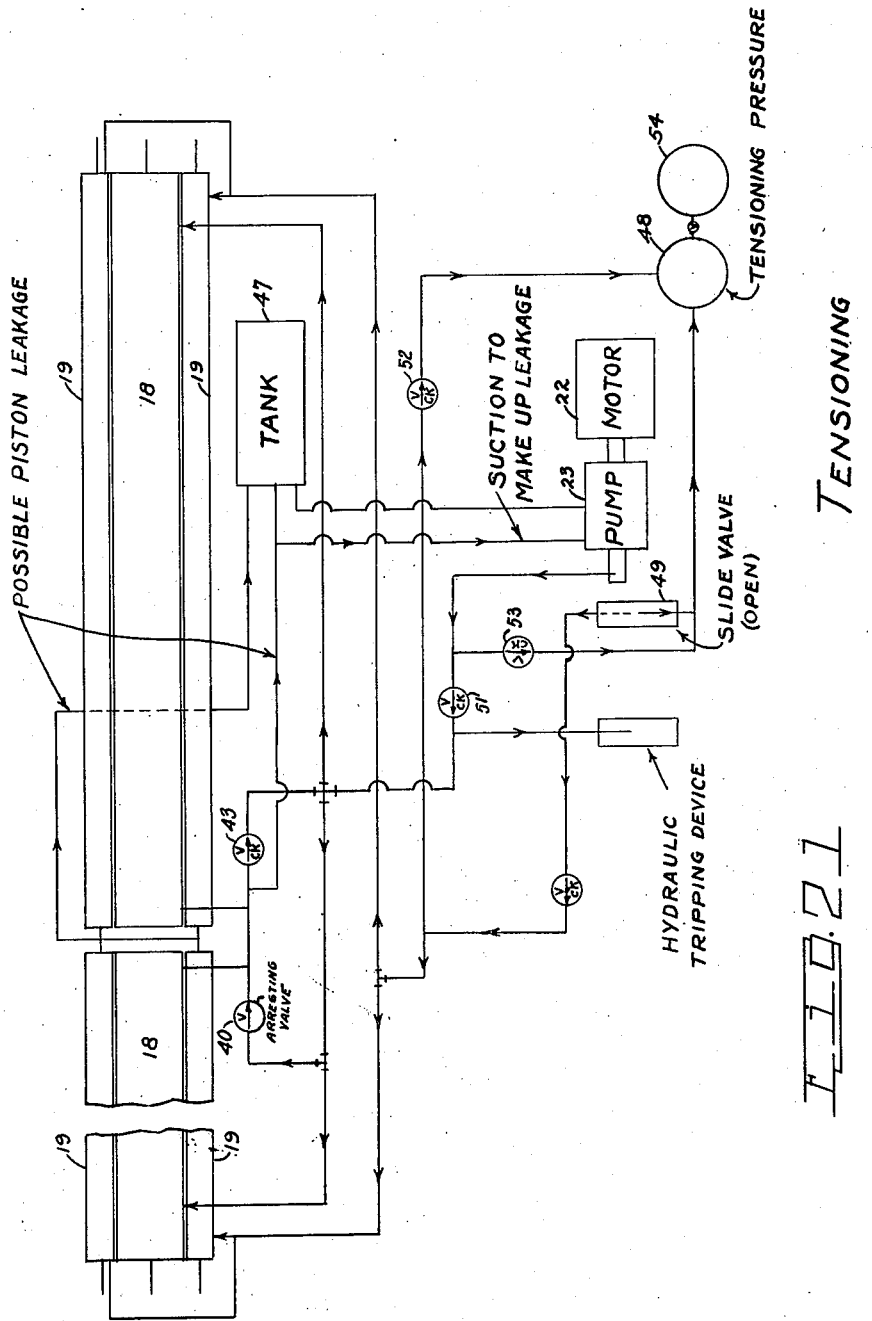

July 5, 1949.　　　C. A. NICHOLSON　　　2,474,858
AIRCRAFT ARRESTING OR RETARDING GEAR
Filed Jan. 22, 1940　　　16 Sheets-Sheet 15
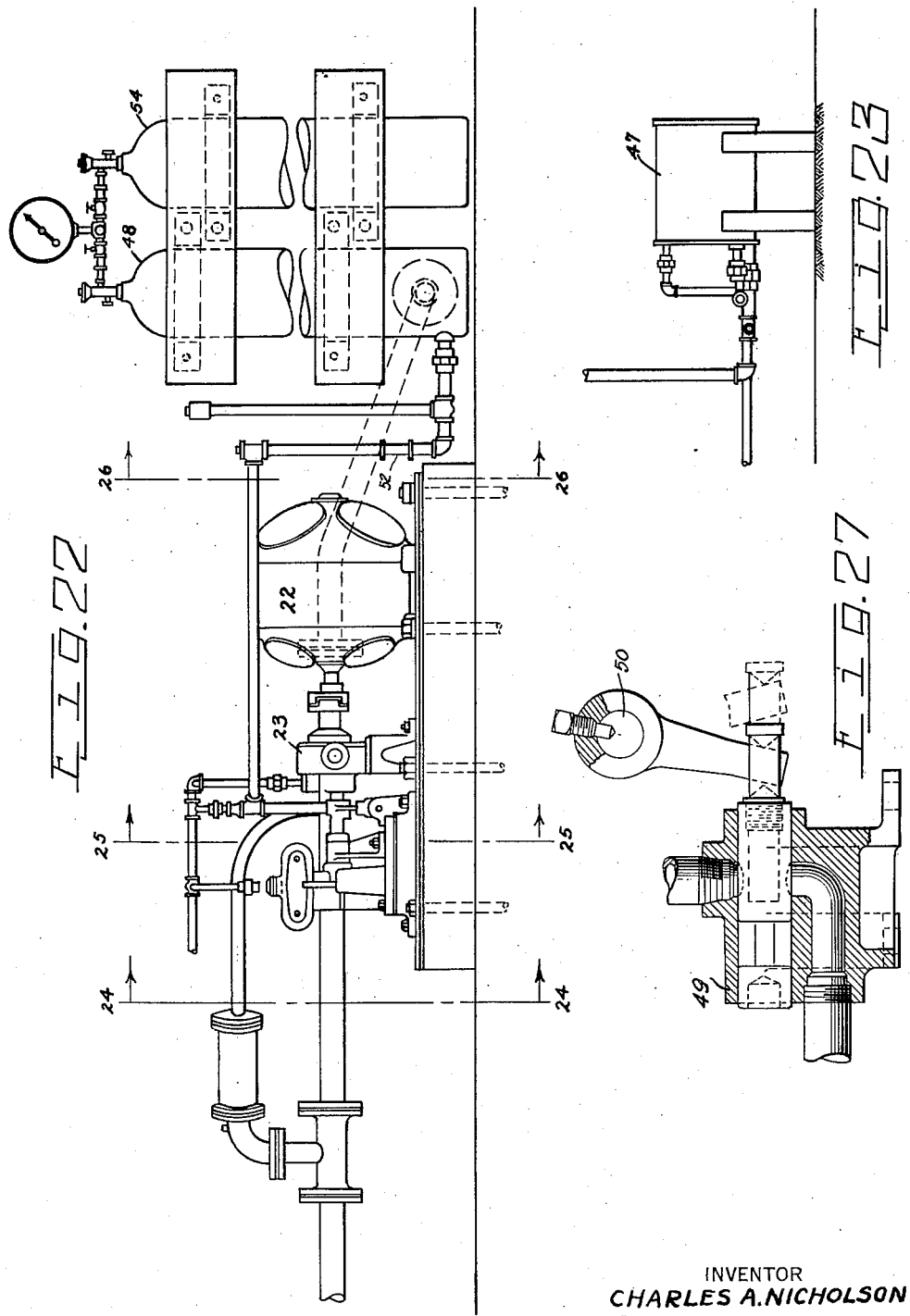
INVENTOR
CHARLES A. NICHOLSON
BY
ATTORNEY July 5, 1949.　　　C. A. NICHOLSON　　　2,474,858
AIRCRAFT ARRESTING OR RETARDING GEAR
Filed Jan. 22, 1940　　　16 Sheets-Sheet 16
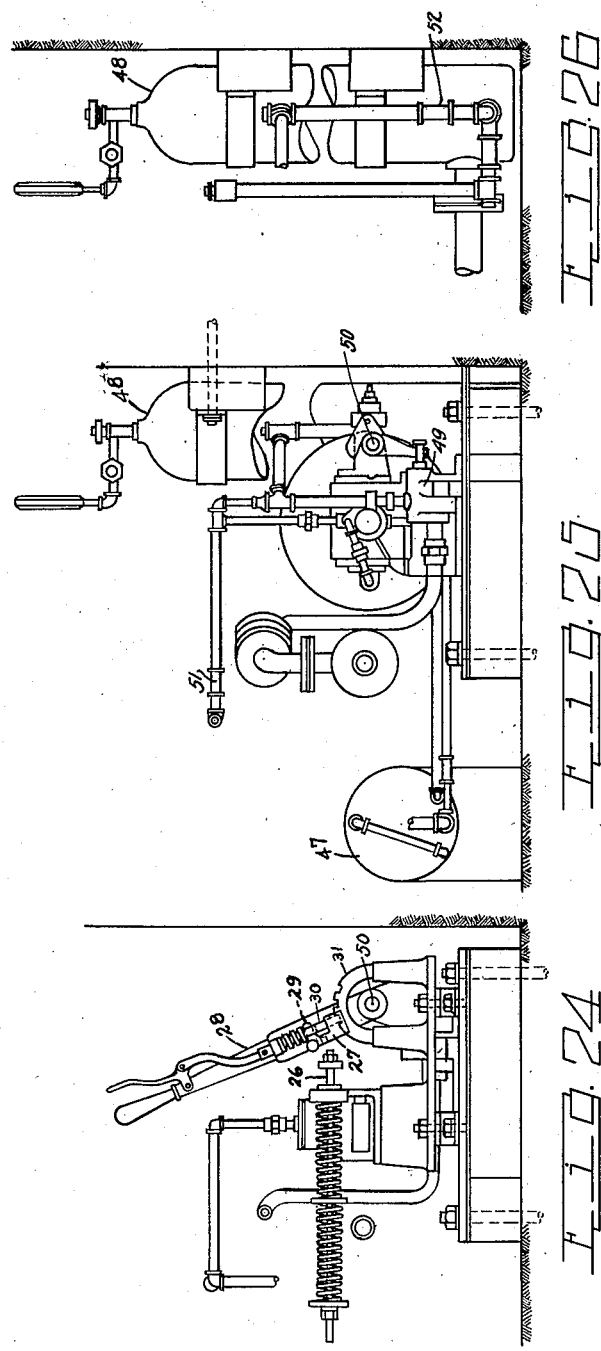
INVENTOR
CHARLES A. NICHOLSON
BY
ATTORNEY Patented July 5, 1949

2,474,858

UNITED STATES PATENT OFFICE 2,474,858

AIRCRAFT ARRESTING OR RETARDING GEAR

Charles A. Nicholson, United States Navy

Application January 22, 1940, Serial No. 314,951

8 Claims. (Cl. 244—110)

(Granted under the act of March 3, 1883, as amended April 30, 1928; 370 O. G. 757)

This invention relates to means for arresting or retarding the flight or motion of aircraft landing in a restricted area.

It is an object of this invention to provide such means in a compact, simple, rugged and foolproof form.

It is a further object of this invention to provide an arresting or retarding means which is easily controllable to give a steady deceleration to a landing airplane at variable rates, without the accompaniment of objectionable tail rise of the airplane.

Other objects will become apparent from a consideration of the following description taken together with the accompanying drawings, in which:

Fig. 2 is a plan view of a portion of the arresting gear as shown in Fig. 1;

Fig. 3 is a front elevation of that portion of the arresting gear shown in Fig. 2;

Figure 12:
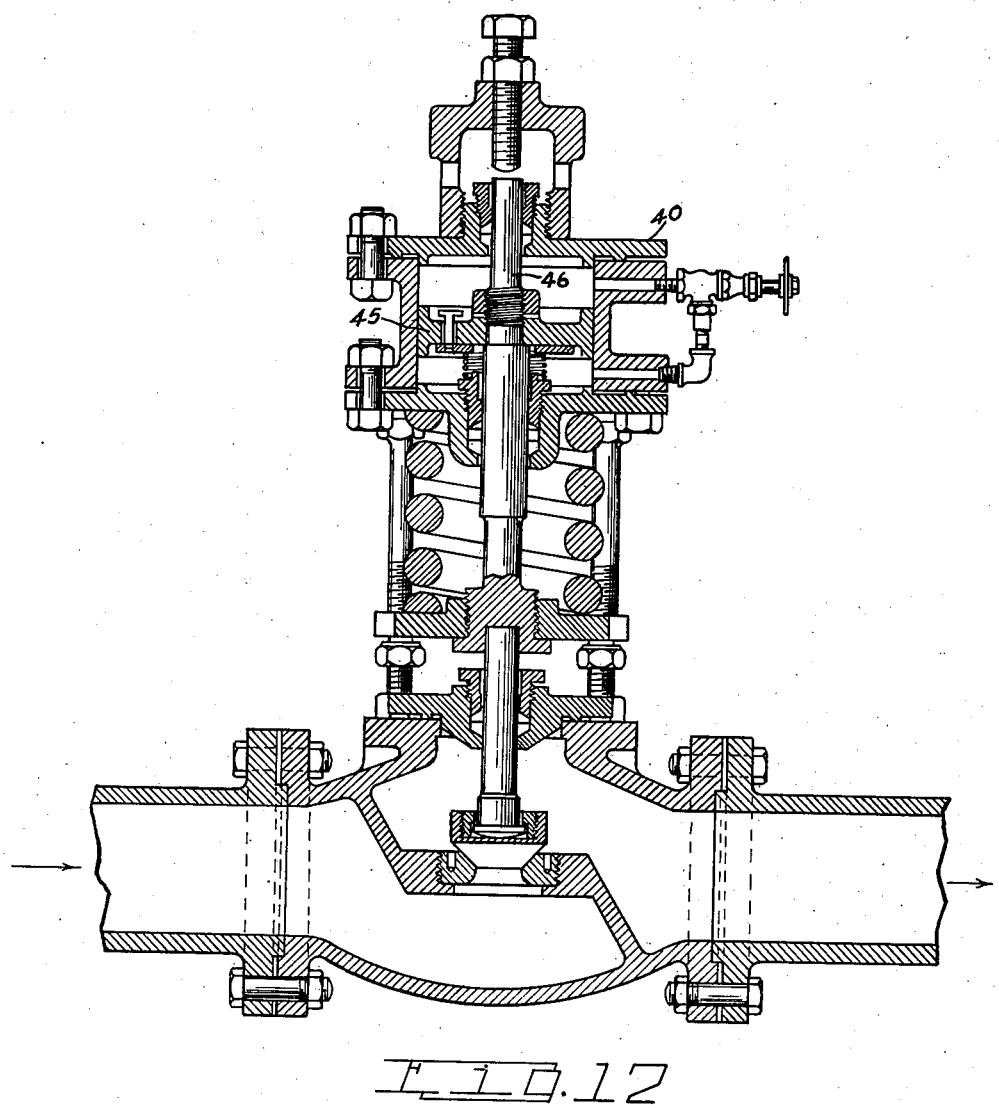

Figs. 4, 5 and 6 are elevational views in section taken along lines 4—4, 5—5, and 6—6, respectively, of Fig. 2;

Figs. 7 and 8 are plan and elevational views respectively of portions of a second embodiment of the invention;

Figs. 9, 10 and 11 are schematic views of the arrangement of the various mechanisms comprising the second embodiment of the invention, showing the conditions existing in the hydraulic system during the operation of arresting an airplane, retrieving the arresting wire and tensioning the arresting wire, respectively;

Figs. 12, 13 and 14 are elevational views in cross-section of the arresting valve, the tensioning valve and the shuttle valve, respectively, as used in the second embodiment of the invention;

Fig. 15 is a plan view of the pump, motor and tank assembly of the second embodiment;

Figs. 16 and 17 are elevational views of portions of the mechanism shown by Fig. 15, taken along lines 16—16 and 17—17 thereof;

Figs. 18, 19, 20 and 21 are schematic views of the arrangement of the various mechanisms comprising a third embodiment of the invention, showing the conditions existing in the hydraulic system during the operations of arresting an airplane, the end of arresting, retrieving the arresting wire and tensioning the arresting wire, respectively;

Fig. 22 is an elevational view of the pump, motor and tank assembly of the third embodiment of the invention;

Fig. 23 is an elevational view of a tank forming a part of the mechanism of Fig. 22, but not shown thereby;

Figs. 24, 25 and 26 are elevational views of portions of the mechanism shown by Fig. 22, taken along lines 24—24, 25—25, and 26—26, respectively; and Fig. 27 is an elevational view of the slide valve used in the third embodiment of the invention and showing its actuating means.

All forms of the invention disclosed herein make use of a tensioned arresting wire extended horizontally slightly above a deck or other landing surface and engageable by a hook suspended from the aircraft to be arrested. This wire in all cases extends at each end to a multi-fold purchase having one fixed and one movable block, the movable block being connected to an hydraulic system which is utilized after the plane has been arrested to retrieve and retension the arresting wire.

Figs. 1 to 6 inclusive, illustrate one embodiment of the invention.

Figure 1:
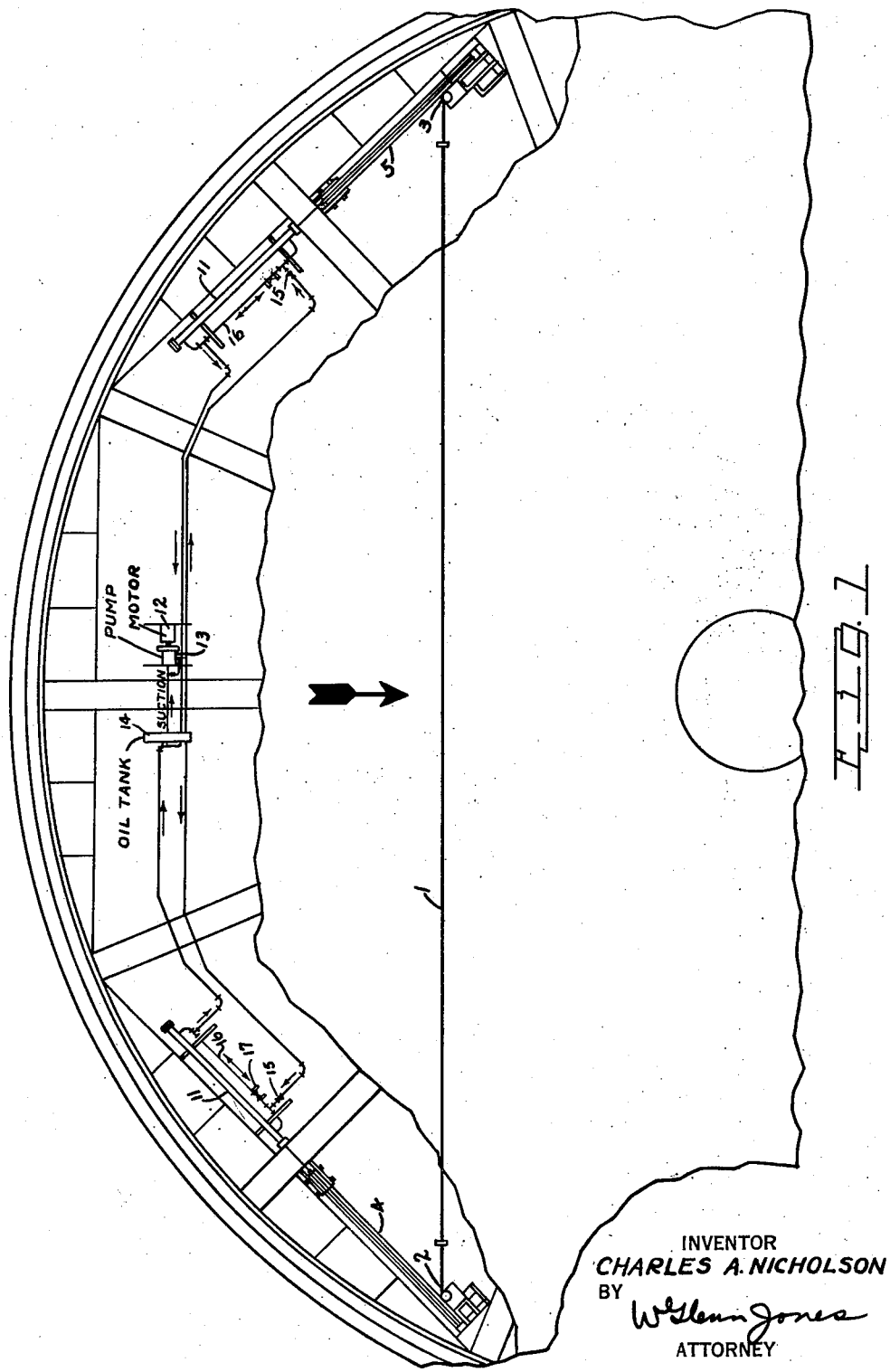
Fig. 1 is a diagrammatic plan view of one embodiment of the arresting gear.

In Fig. 1, the landing wire 1 is shown led at each end around stationary sheaves 2, 3, and thence to the multifold purchases 4 and 5. Each extremity of the line is, after having been led through its respective purchase, secured as at 6 in Fig. 2 to a fixed part of the landing platform. Each purchase consists of a stationary block 7 and a movable block 8. As shown in Fig. 2, the movable block 8 is mounted for rolling motion along tracks 9.

The movable block of each purchase is connected to a piston 10 sliding in an hydraulic cylinder 11. An electrical motor 12 located beneath the landing platform drives a pump 13 at a constant speed. The pump takes suction from an oil tank 14 and also from the inner end of each cylinder. The pump discharges into the outer end of each cylinder through check valve 15, located in each branch of the discharge line. The inner and outer ends of each cylinder are hydraulically connected by a line 16 containing a constant pressure valve 17 which opens when the pressure in the outer end of the cylinder reaches a predetermined value.

Prior to the landing of the plane the landing wire 1 is in a condition of tension. This is caused by the action of pump 13 maintaining pressure in the outer end of the cylinders 11. After the desired pressure is obtained, the pump discharge passes through valves 17 into the suction line.

When the landing hook of a plane contacts the landing wire 1 the pistons 10 are drawn towards the outer ends of cylinders 11, forcing the oil in the outer end of each cylinder to the inner end via valve 17. After the arresting of the plane is completed the pump 13 continuing to function as before, returns the pistons to their original positions and thus retrieves and tensions the landing wire 1 in readiness for other landings.

During the arresting operation the check valves 15 protect the pump from excessive pressures.

Figs. 7 to 17 inclusive, illustrate a second embodiment of the invention. This embodiment makes use of two main cylinders 18, as before, but in this case each main cylinder is provided with a pair of auxiliary cylinders 19 containing pistons 20. The piston rods of each main cylinder are connected to the rods of its auxiliary cylinders by a cross-head 21, as shown in Fig. 8. The two cylinder assemblies are hydraulically inter-connected so that the pressure on both will be approximately the same. Normally, a plurality of arresting wires are made use of and each landing wire is provided with an arresting gear comprising two cylinder assemblies, as described above. An arrangement designed for the use of two arresting wires is shown in each of Figs. 9, 10 and 11.

A constant speed electric motor 22 drives a variable delivery hydraulic pump 23 which furnishes pressure for retrieving and tensioning the arresting wires. The pump is fitted with an automatic pressure control device that operates automatically so as to prevent the discharge pressure from exceeding the desired tensioning pressure. This device is illustrated in Figs. 15, 16 and 17. A plunger 33, the position of which governs the discharge flow from pump 23, is connected by link 34 to one end of lever 35, the other end of which is positioned by a rod 36 passing therethrough and carrying a spring 37 contacting the lever. The position of the rod 36 is controlled by means of a linkage 32 connecting it with a hand lever 28. A pipe 38 subjects plunger 33 to discharge pressure.

The pump is also fitted with an hydraulic tripping device combined with but not affecting the operation of the automatic pressure control device. This tripping device, which is adjustable, operates when the pressure in the cylinders, due to arresting, exceeds the tensioning pressure by a predetermined amount, and locks the pump in neutral, permitting no delivery. The tripping device is capable of being reset manually to allow the pump to operate at full capacity when retrieving of the wire payed out on deck is desired.

This device is illustrated in Figs. 15, 16 and 17. A line 24 leads from the discharge side of pump 23 to a cylinder 25 in which is located a piston 26 normally spring-pressed into its innermost position. The outer end of piston 26 contacts a latch 27 on a hand lever 28. When pressure in line 24 increases sufficiently to overcome the tension of the springs governing the position of piston 26, latch 27 is actuated and in turn rotates a bell crank lever 29 about its pivot point, thus withdrawing a plunger 30 from its locking position in a notched member 31. Further pressure by piston 26 rotates hand lever 28 about its pivot point and operates the linkage 32 to restore the variable delivery pump to neutral and reduce its delivery to zero.

It will be noted that upon a reduction of pressure in line 24 the hand lever can be set at its initial position and the pump thereby placed on stroke. The structure of the pump and the mechanism controlling its stroke are well known, and since they do not form a part of this invention, it is considered unnecessary to illustrate or describe them in detail.

The pump 23 discharges through a check valve 39 which protects it from damage due to excessive pressures in the hydraulic system. The opposite ends of the main cylinders 18 are connected by piping which includes an adjustable spring-loaded arresting valve 40. The outer ends of the auxiliary cylinders are connected to the inner ends of the main cylinders by piping which includes a spring-loaded tensioning valve 41, as well as arresting valve 40. A shuttle valve 42 prevents pressures due to arresting from being communicated from one cylinder assembly to another when a plurality of such assemblies is used. The inner ends of the auxiliary cylinders are connected to a reserve tank 47.

When the arresting hook from the airplane engages the landing wire the pistons of all cylinders are drawn towards the outer ends of their respective cylinders. The initial resistance to the paying out of the arresting wire, which is the tensioning pressure on the pistons, is immediately stepped up to the pressure determined by the setting of the arresting valve 40. This pressure operates the hydraulic tripping device, locking the pump in neutral and permitting no delivery therefrom, although the motor and pump continue to rotate. A check valve 43 prevents the oil under pressure from directly entering the inner ends of the main cylinders 18. The oil from the four auxiliary cylinders first flows through the tensioning valve 41, and then joining the oil from the main cylinders flows through the arresting valve 40 at a high velocity, whence it goes to fill up the inner end of the main cylinders 18. The excess due to the amount of oil coming from the auxiliary cylinders being greater than that necessary to make up for the piston rod displacement of the main cylinders, flows to the tank 47.

The tensioning valve 41, as shown in Fig. 13, is equipped with a balanced piston 44 which prevents its closing until the arresting pressure has dropped below a predetermined minimum value when the tensioning valve is set to open at a specified higher pressure. Closing of the valve at this pressure should not materially affect the tail rise of the airplane near the end of the arrested run as the net area of the pistons of the auxiliary cylinders represents only a small percentage of the total net piston area.

It should be noted that the arresting valve 40, as shown in Fig. 12, is equipped with a dashpot, the piston 45 of which is secured to the upper valve stem 46. The purpose of this dashpot is to provide delayed closing of the valve in order to allow the tail of the airplane to gradually settle on the deck near the end of an arrested run.

After the airplane is arrested and the arresting hook is free, the arresting wire that has been payed out can be retrieved and tensioned. As the pump and motor are still turning over the only manual operation necessary will be the resetting of the hydraulic tripping device, which will allow the pump to operate at full capacity. The oil delivery by the pump then flows through check valve 39 to the front end of the auxiliary cylinders and the motion of the pistons in these auxiliary cylinders is transmitted directly to the main pistons, which by-passes the oil in the inner ends of the main cylinders, through the check valve 43, around the arresting valve and into the outer ends of the main cylinders. The excess oil in the inner ends of the main cylinders goes to the tank 47, which is connected to the pump suction. The use of auxiliary cylinders for retrieving the arresting wire reduces the necessary weight and size of the pumping unit. The tensioning of the wire on deck is automatically accomplished when the pressure of the pump exceeds the setting of the tensioning valve. When this occurs the tensioning valve opens, the pump pressure is applied on all the pistons and the wire on deck is then tensioned. The pump will continue to run during tensioning and will maintain the desired tensioning pressure at which the automatic pressure control device has been set and take care of the leakage past the pistons.

Figs. 18 to 27 inclusive, illustrate a third embodiment of the invention, which utilizes the energy of the landing plane to compress air in an accumulator tank for use in retrieving the landing wire. By this means the size of the motor and pump may be considerably reduced over those necessary for use with the second embodiment.

In this embodiment the oil displaced during arresting by the pistons in the main cylinders, which are hydraulically inter-connected, is fed into the inner ends of the main cylinders through the arresting valve 40 while the oil displaced by the pistons of the four auxiliary cylinders goes to an accumulator tank 48 and increases the compression of the air in this tank above the original tensioning pressure, thereby storing up energy for retrieving and tensioning the arresting wire after it has been payed out. It will be seen that the major part of arresting will be accomplished by the main cylinders, especially at the higher pressures, and therefore the limit of capacity will not be as great as the system comprising the second embodiment described above.

The pump is fitted with the same type of automatic pressure control device and hydraulic tripping device described above in connection with the second embodiment of the invention. However, a slide valve 49, as illustrated in Fig. 27, is mechanically connected to a shaft 50 to which hand lever 28 is secured, and which forms the pivoting point for said lever. Thus, movement of the hand lever moves the piston of the slide valve. Actuation of the hydraulic tripping device caused by arresting pressure in the system will at the same time close the slide valve and prevent air retrieving until the tripping device has been manually reset.

Conditions in the system during the operation of arresting are shown in Figs. 18 and 19. At the beginning of the arresting action the arresting hook of the airplane engages the arresting wire and draws all pistons towards the outer ends of their respective cylinders. The fluid in the outer ends of the main cylinders travels as is shown in Fig. 18 through arresting valve 40 and into the inner ends of the main cylinders. This fluid is prevented from flowing directly to the inner ends of these cylinders by check valve 43. The initial resistance to the movement of the pistons is the tensioning pressure existing in the cylinders. Immediately upon movement of the pistons the pressure is stepped up in the two main cylinders, which are hydraulically inter-connected, to the pressure determined by the setting of the arresting valve. The pressure is stepped up progressively in the four auxiliary cylinders, which are also hydraulically inter-connected, from the initial tensioning pressure to a maximum at the end of the arresting action, depending upon the compression ratio in the accumulator tank 48.

The arresting pressure developed in the main cylinders operates the hydraulic tripping device, locking the pump in neutral and closing the slide valve 49. A check valve 51 protects the pump from the arresting pressure. Some oil is sucked from reserve tank 47 into the inner ends of the main cylinders to make up for piston rod displacement. The arresting valve 40, shown in Fig. 12, operates in the same manner as described in connection with the second embodiment of the invention, its closing being delayed in order to allow the tail of the airplane to gradually settle on deck near the end of the arrested run. The oil displaced by the pistons in the four auxiliary cylinders flows through the check valve 52 into the closed accumulator tank 48, which is subject to the air pressure necessary for proper tensioning and the oil level of which is dependent upon the compression ratio necessary to give satisfactory retrieving speeds. During the last part of the arresting action the pressure on the main pistons is lower than that on the four auxiliary pistons, due to the delayed closing feature of the arresting valve. A check valve 53 prevents any pressure equalization.

Since the slide valve 49 was closed during the arresting action and check valves 52 and 53 prevent a return flow from the tank 48 to the main cylinders at the completion of the arresting action, it is evident that retrieving cannot commence until the slide valve 49 has been opened. To start this action it is only necessary to manually reset the hydraulic tripping device by operation of hand lever 28, thus opening the slide valve 49 and permitting the energy stored by compressing air in accumulator tank 48 during the arresting action to deliver oil to the four auxiliary cylinders. The motion of the pistons of these cylinders is transmitted directly to the main pistons which bypasses the oil through the check valve 43 around the arresting valve and into the outer ends of the two main cylinders. The excess of oil in the inner ends of the main cylinders, due to piston rod displacement, goes to the vented reserve tank 47 which is connected to the pump suction. The resetting of the hydraulic tripping device permits the pump to operate at full capacity, but the pump is so chosen that its full capacity is very low, for example, about one gallon per minute, and since the time for retrieving will run from five to ten seconds, depending upon the amount of arresting wire payed out during the arresting action, it will be seen that the pump will handle but a small amount of oil which goes from the inner end to the outer end of the two main cylinders, and will be unable to build up pressure on the main pistons during retrieving.

When the four auxiliary cylinders have completed the retrieving action and have partly tensioned the arresting wire and can no longer carry on, due to their small net area, the pump which has been operating builds up the required tensioning pressure directly on the main pistons and by way of the slide valve on the auxiliary pistons and the accumulator tank. The pump will continue to run during tensioning and will maintain the desired tensioning pressure at which the automatic pressure control device has been set. The capacity of the pump and the leakage conditions in the system should be such that the pump will be able to maintain this pressure against the leakage in the system.

A make-up tank 54 is connected to accumulator tank 48 for use in maintaining the desired initial air pressure in the latter.

While the disclosure of this application has been limited to three embodiments of the invention, the scope of the invention is to be considered as restricted only by the scope and limitations of the appended claims.

The invention described herein may be manufactured and/or used by or for the Government of the United States of America for governmental purposes without the payment of any royalties thereon or therefor.

I claim:

1. In a means for arresting the motion of a landing aircraft, having a landing cable placed across the path of the aircraft, force multiplying means fixing each end of said cable with respect to the landing surface, fluid pressure operated tensioning and retrieving means for the cable in engagement with each force multiplying means, and a motor and a pump assembly connected with both tensioning and retrieving means; an automatic pressure control device for the pump and tensioning and retrieving means comprising a variable delivery hydraulic pump, a plunger the position of which governs the discharge flow of fluid from the pump, a pipe subjecting the plunger to discharge pressure from the pump, a pivoted vertical lever connected at its lower end with the plunger, a horizontal rod passing through the upper end of the vertical lever adapted to position the latter, and carrying a spring contacting said lever and acting thereupon, a hand lever mounted on a fixed supporting pintle and controlling through a linkage the position of the horizontal rod, the whole automatic control device being intended to automatically prevent the discharge pressure from the pump exceeding a predetermined tensioning pressure suitable to operate the tensioning and retrieving means, and landing cable.

2. In a means for arresting the motion of a landing aircraft, having a landing cable placed across the path of the aircraft, force multiplying means fixing each end of said cable with respect to the landing surface, fluid pressure operated, tensioning and retrieving means for the cable in engagement with each force multiplying means, and a motor and a pump assembly connected with both tensioning and retrieving means; an automatic pressure control device for the pump and tensioning and retrieving means comprising a variable delivery hydraulic pump, a plunger the position of which governs the discharge flow of fluid from the pump, a pipe subjecting the plunger to discharge pressure from the pump, a pivoted vertical lever connected at its lower end with the plunger, a horizontal rod passing through the upper end of the vertical lever adapted to position the latter, and carrying a spring contacting said lever and acting thereupon, a hand lever mounted on a fixed supporting pintle and controlling through a linkage the position of the horizontal rod, the whole automatic control device being intended to automatically prevent the discharge pressure from the pump exceeding a predetermined tensioning pressure; and an hydraulic tripping device adapted to operate when the pressure in the tensioning and retrieving means due to arresting the aircraft exceeds the desirable tensioning pressure therein by a predetermined amount, and locks the pump in neutral, thereby stopping the delivery of fluid therefrom, said tripping device comprising a fluid pressure pipe connected with the discharge side of the pump, a cylinder having a piston therein connected with said pressure pipe, spring-pressed means for normally holding the said piston in its innermost position, a latch on the above-mentioned hand lever of the automatic pressure control device, adapted to be actuated by the cylinder piston when the pressure in the fluid pressure pipe increases sufficiently to overcome the spring-pressed means holding the cylinder piston in its normal position, a pivotally mounted bell-crank lever adapted to be rotated by the aforesaid latch, a fixedly mounted arc-shaped notched member, a slidable spring-pressed plunger on the hand lever normally in engagement with the notched member, and adapted to be disengaged therefrom upon actuation by the bell-crank lever, the said hand lever upon actuation of the cylinder piston in turn operating the linkage of the automatic pressure control device for the purpose of restoring the variable discharge pump to neutral, and reduce the fluid discharge delivery thereof to zero.

3. In a means for arresting motion of a landing aircraft, having a landing cable and a force multiplying purchase fixing each end of said cable with respect to the landing surface, and said arresting means having the following parts, a pair of cylinder assemblies each provided with a main and auxiliary hydraulic cylinder, corresponding cylinders of each assembly being hydraulically inter-connected, a piston for each of said cylinders, means for making the pistons for each cylinder assembly act as a unit with respect to each of the multiplying purchases, a variable discharge hydraulic pump, hydraulic means connecting the opposite ends of each of the main cylinders, a constant pressure valve in the last-named connecting means, permitting flow from the outer ends to inner ends of the cylinders when the pressure in the former reaches a magnitude sufficient to furnish to the landing cable through the force multiplying means a desired and predetermined tensioning force which is less than that exerted by a landing aircraft in the direction of its forward motion, the said aircraft arresting means being further provided with hydraulic means connecting the working ends of the said auxiliary cylinders through the constant pressure valve, a second valve in the last-named hydraulic connecting means which is set to open at lower pressures than the first-named valve; means operable to reduce the discharge of the said pump to zero upon the occurrence in said cylinder assemblies of a pressure materially in excess of the pressure necessary to open the constant pressure valve, comprising, an automatic pressure control device, consisting of a variable delivery hydraulic pump, a plunger the position of which governs the discharge flow from the pump, a pipe subjecting the plunger to discharge pressure, a vertical lever connected with the plunger, a horizontal rod passing through the upper end of the vertical lever, adapted to position the latter, and carrying a spring contacting said lever, a hand lever mounted on a fixed supporting pintle, and controlling by a linkage the position of the horizontal rod; and an adjustable hydraulic tripping device adapted to operate when the pressure in the cylinder assemblies due to arresting the aircraft exceeds the tensioning pressure therein by a predetermined amount, and locks the pump in neutral thereby stopping the fluid delivery of same, said tripping device consisting of a fluid pressure pipe connected with the discharge side of the pump, a cylinder having a piston therein, connected with said pressure pipe, spring-pressed means for normally holding the piston in its innermost position, a latch mounted on the hand lever of the automatic pressure control device adapted to be actuated by the said cylinder piston when the fluid pressure in the fluid pressure pipe increases sufficiently to overcome the spring pressed means holding the cylinder piston in its normal position, a pivotally mounted bell-crank lever adapted to be rotated by the aforesaid latch, a fixedly mounted arc-shaped notched member, a slidable spring pressed plunger on the before-mentioned hand lever normally in engagement with the notched member, and adapted to be disengaged therefrom, upon actuation by the bell-crank lever, the said hand lever upon actuation of the cylinder piston in turn operating the linkage of the automatic pressure control device for the purpose of restoring the variable discharge pump to neutral, and reduce the fluid discharge delivery thereof to zero.

4. In a means for arresting the motion of a landing aircraft, having a landing cable and a force multiplying means fixing each end of said cable with respect to the landing surface, means for applying to said landing cable a tensioning force of predetermined magnitude comprising a pair of oppositely disposed hydraulic cylinders each having a piston attached to one of the force multiplying means, a fluid pressure pipe connecting the inner and outer ends of each hydraulic cylinder, a constant pressure valve in each pressure pipe adapted to permit fluid pressure from the outer end of the cylinders to reach the inner end thereof when the pressure in the former reaches a magnitude sufficient to furnish to the cable through the force multiplying means a desired tensioning force, which is less than that exerted by a landing aircraft in the direction of its forward motion.

5. A means for arresting the motion of a landing aircraft as in claim 4, in combination with a fluid pressure system for each fluid pressure pipe which is connected to both ends of said pipe, and is provided with means for preventing retrograde flow through the portion of same leading to the outer end of said pressure pipe, after the fluid has been admitted to the outer end of the hydraulic cylinders, and said system being also adapted to return fluid into the system after it has been admitted to the inner end of the hydraulic cylinders and has passed through the constant pressure valve.

6. In a means for arresting the motion of a landing aircraft, a pump and motor assembly, located in the center of an arcial arrangement of the arresting means, a landing cable disposed like a chord across the ends of the arc, a pair of force multiplying means attached to the ends of the cable, and located at the ends of the arc, a pair of opposed arresting and retrieving means each connected with a force multiplying means, and located adjacent thereto within the said arc, and a pair of fluid pressure means connecting the arresting and retrieving means with the pump and motor assembly and also located within and in proximate relation with the said arc.

7. In a means for arresting the motion of a landing aircraft, a landing cable, a force multiplying purchase fixing each end of said cable with respect to the landing surface, an accumulator tank, means connected to said force multiplying purchase utilizing a portion of the energy of the landing plane to compress air in said tank, and means operated by said pressure in said tank for retrieving said landing cable.

8. In a means for arresting the motion of landing aircraft, a landing cable, a force multiplying purchase fixing each end of said cable with respect to the landing surface, an accumulator tank under pressure sufficient to furnish a tensioning force on the cable through the force multiplying purchase, means connected to said force multiplying purchase utilizing a portion of the energy of the landing plane to increase the pressure in said tank, and means operated by said excess of pressure in said tank for retrieving the landing cable, the tank then supplying only the necessary tensioning pressure.

CHARLES A. NICHOLSON.

REFERENCES CITED

The following references are of record in the file of this patent:

UNITED STATES PATENTS

| Number | Name | Date |
| --- | --- | --- |
| 2,145,685 | Chilton | Jan. 31, 1939 |
| 2,151,704 | King | Mar. 28, 1939 |

FOREIGN PATENTS

| Number | Country | Date |
| --- | --- | --- |
| 29,906 | Great Britain | 1912 |
| 258,640 | Great Britain | Sept. 20, 1926 |
| 287,189 | Great Britain | Mar. 12, 1928 |